H. P. AGEE.
AGRICULTURAL DEVICE.
APPLICATION FILED AUG. 22, 1913.
1,188,131.
Patented June 20, 1916.
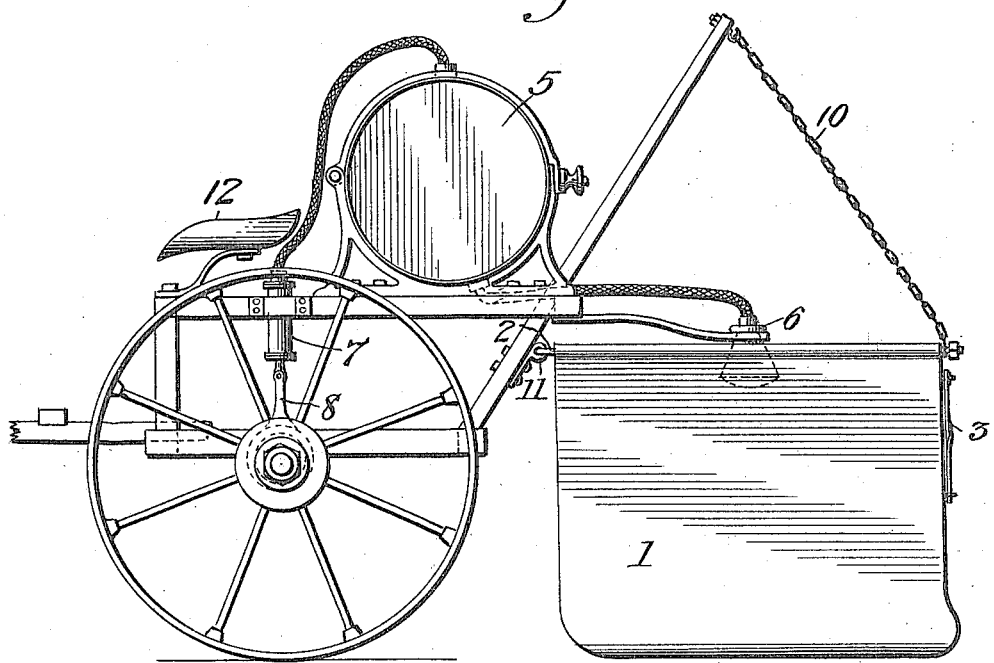
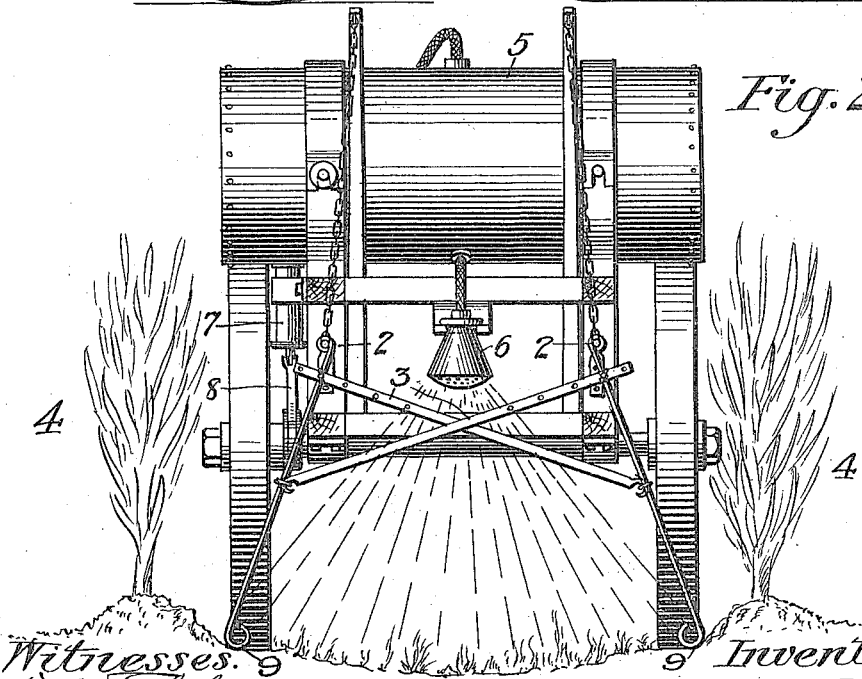
Witnesses
Inventor

UNITED STATES PATENT OFFICE.

HAMILTON P. AGEE, OF HONOLULU, TERRITORY OF HAWAII.

AGRICULTURAL DEVICE.

1,188,131. Specification of Letters Patent. Patented June 20, 1916.

Application filed August 22, 1913. Serial No. 786,148.

*To all whom it may concern:*

Be it known that I, HAMILTON POPE AGEE, a citizen of the United States, residing at Honolulu, in the county of Honolulu and Territory of Hawaii, have invented a certain new and useful Agricultural Device; and I do hereby declare the following to be a full, clear, and exact description of the invention, such as will enable others skilled in the art to which it appertains to make and use the same.

The object of the invention is to afford a means of checking the growth of grass or weeds in cultivated fields, aside from the usual method of scarifying the surface of the soil with cultivators and the like. It is intended to be particularly adapted to circumstances which make the use of plows or cultivators undesirable, for instance in localities of heavy rainfall where injurious puddling might ensue from working the soil.

The invention contemplates a portable shield within which a solution or any other substance deleterious to the growth of grass or weeds is allowed to be played through a spray nozzle or the like from a suitable container. The shield confines the deleterious substance or solution to the grass and weeds.

The following is a specific description of one form of the invention, while the actual scope thereof is defined in the appended claims.

The accompanying drawing forming a part of this specification gives in Figure 1 a side and in Fig. 2 a rear elevation of the invention.

The essential features are: a shield of suitable size and construction, 1. This shield is pivotally supported on a rod 2 and may be spread or narrowed by means of the adjustable braces 3 in accordance with the space between the rows of cultivated plants, 4. A container, 5, of suitable size and shape is conveniently placed to deliver a solution through a tube to a spray nozzle (or nozzles) 6. This container and nozzle may be so fitted as to be readily detached when the container is empty and interchanged with a full container and nozzle to avoid delay in filling the container. Compressed air may be applied to the container (as a means of ejecting the solution) by the aid of a pump 7, which may be operated at will by attaching a piston connection, 8 eccentrically with the axle.

The device may be mounted on any suitable framework and running gear and may be propelled by animal, motor, or hand power. The shield, 1, may be mounted on wheels or it may drag, and in the latter case it may be provided with curved edges 9 to act as runners. Again it may be suspended by the chain, 10, and may be provided with a hinged joint at, 11, so that it may be lifted clear of the ground when going to or from the field. A driver's seat is indicated at 12.

I claim:

1. An agricultural machine for checking the growth of grass or weeds between the rows of plants in a cultivated field, comprising a vehicle, a reservoir carried thereby adapted to contain a quantity of deleterious material to be applied to the ground, means to deliver such material to the ground, and a shield disposed on either side of said last-named means to prevent the deleterious material from being delivered on the adjacent plants, said shields being adjustable to vary the area over which the material can be sprayed and hingedly mounted on the vehicle to permit them to be swung to an inoperative position.

2. An agricultural machine for checking the growth of grass or weeds between the rows of plants in a cultivated field, comprising a vehicle, a reservoir carried thereby adapted to contain a quantity of deleterious material to be applied to the ground means to deliver such material to the ground, a shield disposed on either side of said last-named means to prevent the deleterious material from being delivered on the adjacent plants, and means for hingedly mounting the shields on the vehicle so as to be capable of swinging movements in substantially vertical planes to operative and inoperative positions, said shields being adjustable to vary the area over which the material is sprayed.

In testimony whereof I affix my signature in the presence of two witnesses.

H. P. AGEE.

Witnesses:
L. L. EDMUNDS,
H. B. CAMPBELL.

Copies of this patent may be obtained for five cents each, by addressing the "Commissioner of Patents, Washington, D. C."